United States Patent [19]

Zinke

[11] Patent Number: 5,650,077
[45] Date of Patent: Jul. 22, 1997

[54] PROCESS AND DEVICE FOR LASER WELDING

[75] Inventor: Karl-Heinz Zinke, Augsburg, Germany

[73] Assignee: Kuka Schweissanlagen + Roboter GmbH, Augsburg, Germany

[21] Appl. No.: 325,248

[22] PCT Filed: Feb. 23, 1994

[86] PCT No.: PCT/EP94/00507
§ 371 Date: Oct. 19, 1994
§ 102(e) Date: Oct. 19, 1994

[87] PCT Pub. No.: WO94/19142
PCT Pub. Date: Sep. 1, 1994

[30] Foreign Application Priority Data

Feb. 26, 1993 [DE] Germany .................. 9302850 U

[51] Int. Cl.$^6$ ...................................... B23K 26/00
[52] U.S. Cl. .................. 219/121.64; 219/121.63
[58] Field of Search .............. 219/121.63, 121.64, 219/89, 109, 110

[56] References Cited

U.S. PATENT DOCUMENTS

| | | | |
|---|---|---|---|
| 3,049,607 | 8/1962 | Stuben et al. | 219/89 |
| 3,131,287 | 4/1964 | Goodrich et al. | 219/89 |
| 3,135,853 | 6/1964 | Goodrich et al. | 219/89 |
| 4,296,304 | 10/1981 | Defourny | 219/110 |
| 4,734,555 | 3/1988 | Ferguson | 219/109 |
| 4,973,817 | 11/1990 | Kanno et al. | 219/121.63 |

Primary Examiner—Geoffrey S. Evans
Attorney, Agent, or Firm—McGlew and Tuttle

[57] ABSTRACT

A process and a device for the laser welding of plates (3, 4) located next to each other, which are held together with a movable clamping device (5). The feed path is measured during the closing of the clamping device (5), the thickness of the plate stack (3, 4) is calculated from this, and sent out. The welding energy is set according to the measured thickness of the plate stack. This can be achieved with an automatic control unit, which automatically sets the welding energy source (11). The welding head (2), designed as a laser focus, may be integrated within the clamping device (5) and may be fed together with same.

15 Claims, 2 Drawing Sheets

PROCESS AND DEVICE FOR LASER WELDING

FIELD OF THE INVENTION

The present invention pertains to a process and a device for laser welding.

BACKGROUND OF THE INVENTION

Laser welding devices, which have a welding energy source and a movable damping device, have been known in practice. The welding energy is set as a function of the workpiece thickness. The value is entered based on the preset parameters. The operator knows the individual plate thickness from the specifications of the components. From this, he calculates the thickness of the plate stack and then sets the welding energy source manually on the basis of predetermined tables. This technique is unsuitable for automation. In addition, it is subject to tolerances and errors.

SUMMARY AND OBJECTS OF THE INVENTION

The object of the present invention is to show a possibility of better and more accurate setting of the laser welding device.

According to the present invention, the feed path is measured by means of a displacement transducer via the damping device, and the thickness of the plate stack is accurately calculated from this by means of a suitable control unit. The welding energy source can be accurately set with this thickness value. This setting can also be performed manually, in which case the operator receives the thickness of the plate stack reported to him by the control unit on a display unit. The advantage is the accurate determination of the plate thickness, which can, moreover, also be performed directly at the welding site by means of a suitable clamping device. The operator's miscalculations in adding up the plate thicknesses are ruled out. Any tolerances in the individual plate thicknesses are also accurately determined.

In the especially advantageous embodiment, the control unit is connected to the welding energy source. As a result, if the control unit is designed properly, the needed welding energy can be set automatically, taking into account other stored welding parameters.

The displacement transducer is arranged on a damping device, which can be done in various manners. Likewise, there are various possibilities for designing the displacement transducer. For an automatic welding device, it is recommended that the damping device be provided with a motor drive, and that the displacement transducer be arranged on the drive. It is advantageously an angle of rotation meter in the motor.

In another embodiment, the displacement transducer may also be associated with the clamping elements, especially clamping tongs, and measure their mutual approach. This is possible, on the one hand, directly at the arms of the tongs. However, it is also possible to provide a gear mechanism, especially a rack-and-pinion gear, or a spindle drive for the synchronous actuation of the tong arms, and to arrange the displacement transducer on the common pinion or on the spindle in this case.

Any type of measurement element, which measures a displacement directly or indirectly via other physical effects, may be used as the displacement transducer.

It is recommended for the welding device to guide the welding head, especially the laser focus of a laser welding device, on one of the tong arms, and to automatically feed it into the welding position on closure of the clamping device. After the damping device has been closed, the welding device is immediately ready to operate and is correctly adjusted. The setting and adjustment process can be repeated anew at each welding point, so that even irregularities in the weld metal are detected and, as a result, they always permit optimized welding to be performed.

While specific embodiments of the invention have been shown and described in detail to illustrate the application of the principles of the invention, it will be understood that the invention may be embodied otherwise without departing from such principles.

The present invention is represented in the drawings schematically and as an example. Specifically, FIG. 1 is a schematic side view of a welding device, FIG. 2 is a representation of the clamping tongs with the displacement transducer, and FIG. 3 is an alternative to FIG. 2 with a spindle drive.

DETAILED DESCRIPTION OF THE PREFERRED EMBODIMENT

Figure 1:
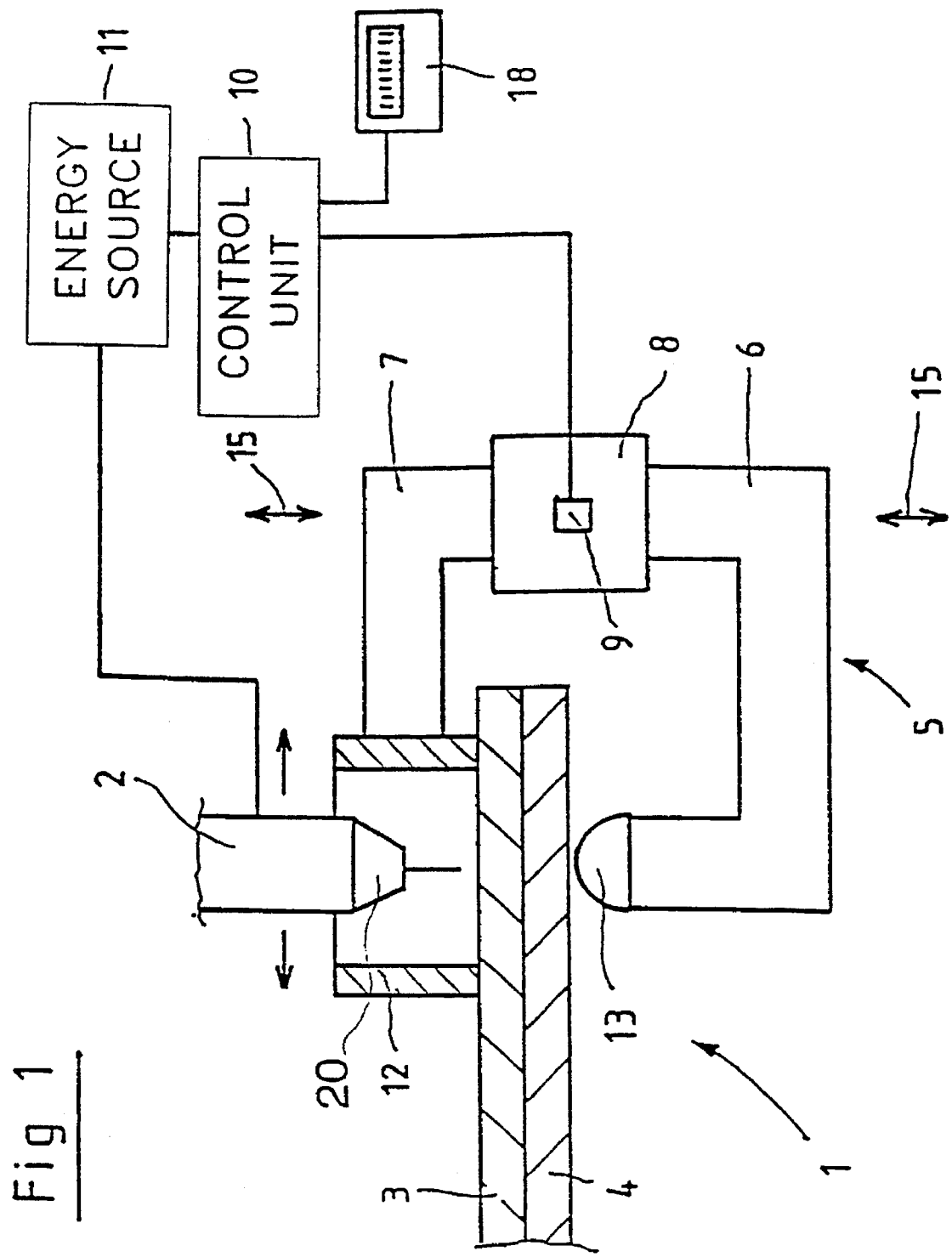

FIG. 1 shows schematically a welding device 1, which is used to weld together two or more plates 3, 4 located next to or on top of one another. The clamping device 5 may additionally guide and position the welding head 2 of the welding device. However, it is not absolutely necessary to assume this function.

In the exemplary embodiment shown, the welding device 1 has a laser welding device with an adjustable welding energy source 11. The welding head 2 is designed as a laser focus 20. The welding energy supplied or the power depends, among other things, on the thickness of the plate stack 3, 4 and must be set correspondingly at the welding energy source 11.

The clamping device 5 is able to automatically determine the thickness of the plate stack 3, 4 during the clamping process. To do so, it has a displacement transducer 9, which is connected to a suitable control device 10. The displacement transducer 9 measures the feed path of the clamping elements, which are designed, e.g., as two tong arms 6, 7 in FIG. 1, but may otherwise have any other shape.

The fed path is reported by the displacement transducer 9 to the control unit 10, which calculates from this the thickness of the plate stack 3, 4 on the basis of the known starting positions of the clamping elements. In the simplest embodiment, the control unit 10 may be designed as a summation circuit. It may also be arranged on the clamping device 5, combined with the displacement transducer 9. However, the control unit 10 is designed as a highly integrated circuit with a microprocessor and various memories in the preferred embodiment.

The control unit 10 sends the calculated value for the thickness of the plate stack 3, 4. This can happen by an optical display unit 18, on which an operator reads the thickness value and manually sets the needed welding energy on the welding energy source 11. It is also possible to take into account other parameters influencing the welding process at the time of the setting.

In the preferred embodiment, the control unit 10 is connected to the welding energy source 11. The control unit 10 may be designed such that it is able to control the entire welding device 1. It will automatically set the necessary welding energy based on the determined thickness of the plate stack 3, 4, and, just as in the case of the manual setting, it is possible to take into account other parameters as well. The parameters influencing the welding process are stored, e.g., in the above-mentioned memories, or they can also be calculated on the basis of other data determined during the welding process, depending on the welding process or the welding device 1.

The displacement transducer 9 may have various designs and may be arranged in different manners on the clamping device 5.

In FIG. 1, a motor drive 8 is provided for the tong arms 6, 7, and the motor drive 8 feeds the tong arms 6, 7 to the plates 3, 4 in the direction of movement 15 indicated by the arrows, and again removes them. The motor drive 8 may contain an electric motor, a pneumatic or hydraulic cylinder, or other drive elements. The displacement transducer 9 is associated with the motor, and is designed, e.g., as an angle of rotation meter seated on the motor axis in the case of an electric motor.

Figure 2:
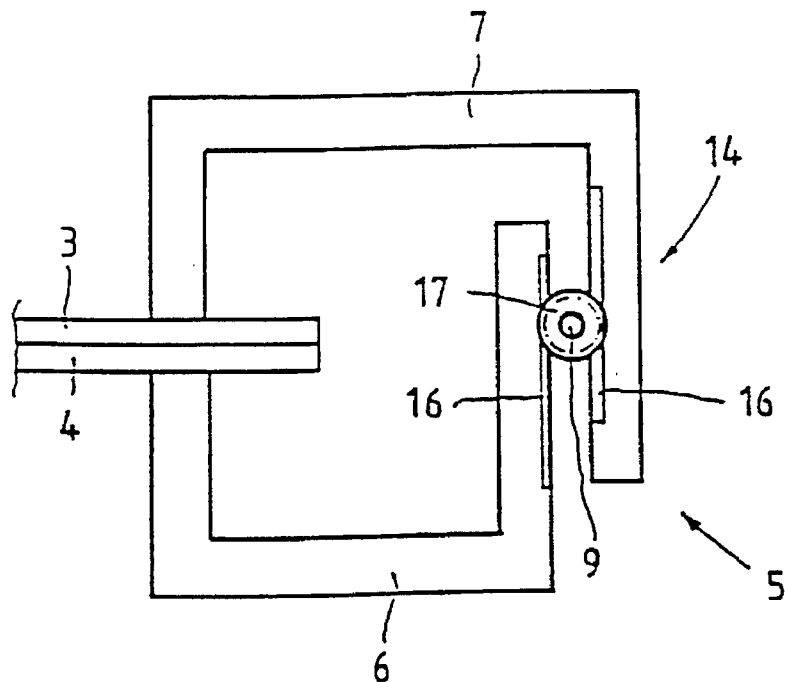
Figure 3:
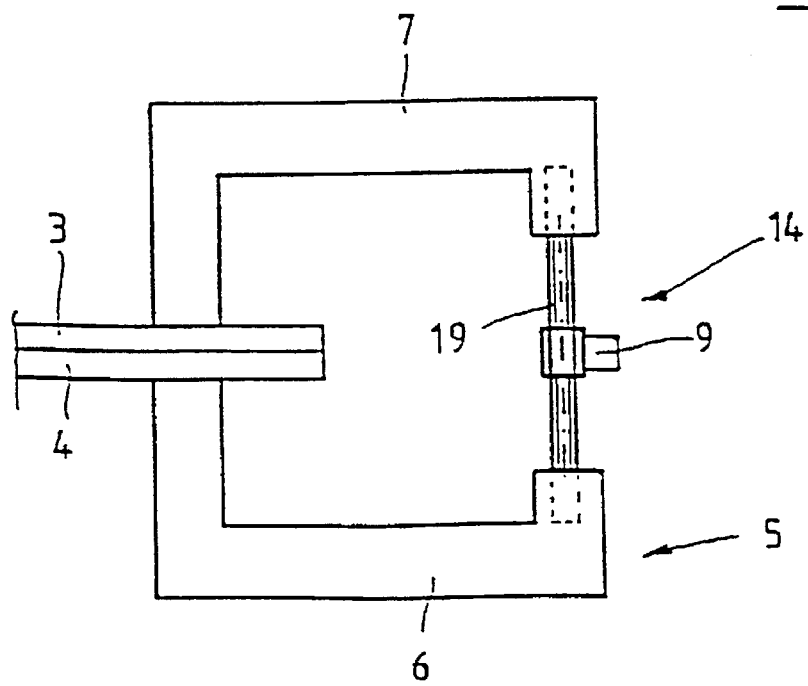

FIGS. 2 and 3 show an alternative, which can also be used for manual operation of the clamping device 5. The tong arms 6, 7 are coupled by a common gear mechanism 14, with which they are moved synchronously toward and away from one another. The displacement transducer 9 is now seated on the gear mechanism 14.

The gear mechanism 14 is designed as a rack-and-pinion gear in FIG. 2. Driving is performed via a common pinion 17, which engages two toothed racks 16 arranged on opposite sides on the tong arms 6, 7. The rotation transducer 9 is mounted on the pinion 17 or on its axis. It is designed, e.g., as a potentiometer, which converts the rotary movement into an electrical signal in the form of a change in resistance.

FIG. 3 shows another design of the gear mechanism 14 in the form of a spindle drive 19. The spindle has two opposite threaded sections, each of which engages a counterthread in the associated tong arm 6, 7. The spindle is actuated by a drive, not represented in detail. The displacement transducer 9 is mounted on the spindle and measures its rotary path. As a variant, it may also be located on the drive.

The displacement transducer 9 may also have another design; e.g., it may be a contactless sensor, which measures the distance between the tong arms 6, 7. It may also be directly coupled with the tong arms 6, 7 and directly detect their movement. To do so, it may measure, e.g., the relative movement between the tong arms 6, 7 or the absolute feed movement of the tong arms 6, 7 from a predetermined starting position, e.g., a stop. The displacement transducer 9 may consist of a plurality of measuring elements for this purpose. This design is advantageous for a clamping device 5 with clamping tongs 6, 7 or other forms of clamping elements, which are driven and fed independently from one another. These may be, e.g., two or more clamping jaws driven individually by cylinders.

The displacement transducer 9 is preferably designed as a measuring element which directly measures the displacement. However, it may also be designed as an indirectly .measuring element, which measures the displacement via, e.g., a change in force, the magnetic flux in an air gap, or on the basis of other physical effects.

The clamping device 5 may be brought into contact with the plates 3, 4 at any point. In the preferred exemplary embodiment shown in FIG. 1, the clamping device 5 comes directly into contact with the welding point. The upper tong arm 7 carries, at its free end, an essentially annular or fork-shaped pressure piston 12, which also forms the mount or guide for the integrated welding head 2. The pressure piston is preferably designed as a circular pipe section, which is engaged essentially in a circular manner by the welding head 2, here a laser focus. The welding head 2 may be mounted movably within the upright pipe section. However, it is recommended that the welding head 2 be adjusted on the pressure piston 12 such that the welding head 2 will also be positioned in the correct position for welding when the pressure piston 12 comes into contact with the plate stack 3, 4.

The other welding tong 6 also carries as a steady a pressure piston 13, which is designed as a rounded strip or as a hemispherical segment here. The pressure piston 13 lies at the clamping site centrically opposite the other pressure piston 12, and it is preferably aligned with the welding point or with the laser beam in the preferred embodiment.

The process and the device for determining the thickness of a plate stack 3, 4 are applicable to all types of welding devices 1, in which plates located next to each other are to be welded together. Besides a laser welding device, resistance welding devices, etc., may also be considered for this purpose.

While a specific embodiment of the invention has been shown and described in detail to illustrate the application of the principles of the invention, it will be understood that the invention may be embodied otherwise without departing from such principles.

I claim:

1. A process for welding with a laser, the process comprising the steps of:

providing workpieces to be welded;

providing a clamping means for clamping the workpieces, said clamping means including first and second clamp arms;

moving said first and second clamp arms together to clamp the workpieces together between said first and second clamp arms;

measuring said moving of said clamp arms;

determining a thickness of the workpiece from said measuring of said moving of said clamp means;

providing a laser welder for welding the workpieces;

determining a power level for said laser welder to weld the workpieces based on said determined thickness of the workpieces;

laser welding the workpieces at said power level with said laser welder.

2. Process according to claim 1, further comprising: a welding energy source for said laser welder: providing an automatic control unit; reporting said measuring of said moving of said clamp arms to said automatic control unit; wherein said steps of determining said thickness value and determining said power level are performed by said automatic control unit including setting said power level at said welding energy source.

3. Process according to claim 1, wherein: the workpieces are a stack of plates clamped at a welding point.

4. Process according to claim 1, further comprising the step of providing a welding head formed as a laser focus, connected to said clamping means.

5. An apparatus for laser welding a stack of plates comprising: a movable clamping means for clamping the stack of plates together; a laser welder with an energy source; displacement transducer means forming a part of said clamping means, said displacement transducer means including a control unit, said displacement transducer means for measuring a feed path of said clamping means wherein said control unit calculates a thickness of said stack of plates from said measured feed path and generates a thickness value signal.

6. Apparatus according to claim 5, further comprising a display unit connected to said control unit.

7. Apparatus according to claim 5, wherein said control unit is connected to said energy source, a value of energy provided by said energy source being set corresponding to said thickness value signal, based on the measured thickness of said stack of plates.

8. Device according to claim 5, wherein said clamping means includes a motor drive, said displacement transducer being arranged on said motor drive.

9. Apparatus according to claim 5, wherein said clamping means includes tongs with tong arms, said displacement transducer being arranged on said tong arms.

10. Apparatus according to claim 9, wherein said tong arms are coupled together by a gear mechanism, said displacement transducer being mounted on said gear mechanism.

11. Apparatus according to claim 5, wherein said displacement transducer is formed as an angle of rotation meter.

12. Apparatus according to claim 5, wherein said welding head is formed as a laser focus, said welding head being integrated within said clamping means.

13. Device according to claim 12, wherein said welding head is guided and can be fed on an end-side tubular pressure piston.

14. Device according to claim 5, wherein aid clamping means acts on a welding point.

15. An apparatus for laser welding a stack of plates comprising: a movable clamping device; a laser welder with an energy source; displacement transducer means forming a part of said clamping device, said displacement transducer including a control unit, said displacement transducer means for measuring a feed path of said clamping device wherein said control unit calculates a thickness of said stack of plates from said measured feed path and generates a thickness value signal; said clamping device including tongs with tong arms, said displacement transducer being arranged on said tong arms, said tong arms being coupled together by a gear mechanism, said gear mechanism being formed as one of a rack-and-pinion gear and a spindle drive, said displacement transducer being mounted on said gear mechanism.

* * * * *